United States Patent
Poovey

(10) Patent No.: US 7,499,607 B2
(45) Date of Patent: Mar. 3, 2009

(54) LIGHT TRIGGERED BENDING ELEMENT LIGHT SWITCH

(76) Inventor: Gary Neal Poovey, 28557 Lemon Ave., Escalon, CA (US) 95320

( * ) Notice: Subject to any disclaimer, the term of this patent is extended or adjusted under 35 U.S.C. 154(b) by 0 days.

(21) Appl. No.: 11/974,483

(22) Filed: Oct. 15, 2007

(65) Prior Publication Data

US 2008/0044132 A1    Feb. 21, 2008

Related U.S. Application Data

(63) Continuation of application No. 10/928,769, filed on Aug. 30, 2004, now Pat. No. 7,283,698.

(51) Int. Cl.
*G02B 6/26* (2006.01)

(52) U.S. Cl. .............. 385/15; 385/16; 385/14; 385/24

(58) Field of Classification Search ............ 385/15, 385/16, 17, 18, 24, 49, 42, 43, 12, 13, 14, 385/132
See application file for complete search history.

(56) References Cited

U.S. PATENT DOCUMENTS

| | | | | |
|---|---|---|---|---|
| 5,095,515 A | * | 3/1992 | Seaver | 385/16 |
| 6,385,363 B1 | * | 5/2002 | Rajic et al. | 385/16 |
| 6,804,427 B2 | * | 10/2004 | Tabata | 385/16 |
| 6,898,342 B2 | * | 5/2005 | Sprague et al. | 385/20 |
| 6,999,221 B1 | * | 2/2006 | Sarkisov et al. | 359/244 |
| 7,072,536 B2 | * | 7/2006 | Poovey | 385/15 |
| 7,283,698 B2 | * | 10/2007 | Poovey | 385/15 |
| 2003/0138190 A1 | * | 7/2003 | Tabata | 385/16 |
| 2003/0138213 A1 | * | 7/2003 | Jin et al. | 385/47 |
| 2004/0028322 A1 | * | 2/2004 | Sprague et al. | 385/23 |
| 2005/0129351 A1 | * | 6/2005 | Poovey | 385/16 |
| 2008/0226225 A1 | * | 9/2008 | Poovey | 385/16 |
| 2008/0253714 A1 | * | 10/2008 | Poovey | 385/16 |

* cited by examiner

*Primary Examiner*—Brian M Healy

(57) ABSTRACT

A LIGHT TRIGGERED BENDING ELEMENT LIGHT SWITCH will be used to turn on or off the light signal in one of two adjacent fiber optic channels by the action of the electric field of the light passing through the channels. LIGHT TRIGGERED BENDING ELEMENT LIGHT SWITCH can be made adjacent to each other so that the bending Elements will latch together and stay in the state required by means of the shape of the ends of the Elements. The bending is accomplished by the response of piezoelectric material to the electric field of light in the fiber optic channel. This will allow information of be stored by the LIGHT TRIGGERED BENDING ELEMENT LIGHT SWITCH that are made to latch. Light of different frequencies may travel in a light channel of appropriate dimensions together without hindering each other. The light that actuates the light switching or latching may be a different frequency than the light signal that is switched on or off. This switch holds the latched position required until light signals of the appropriate wavelength and power in the proper sequence are applied to the LIGHT TRIGGERED BENDING ELEMENT LIGHT SWITCH to cause the unlatching.

13 Claims, 3 Drawing Sheets

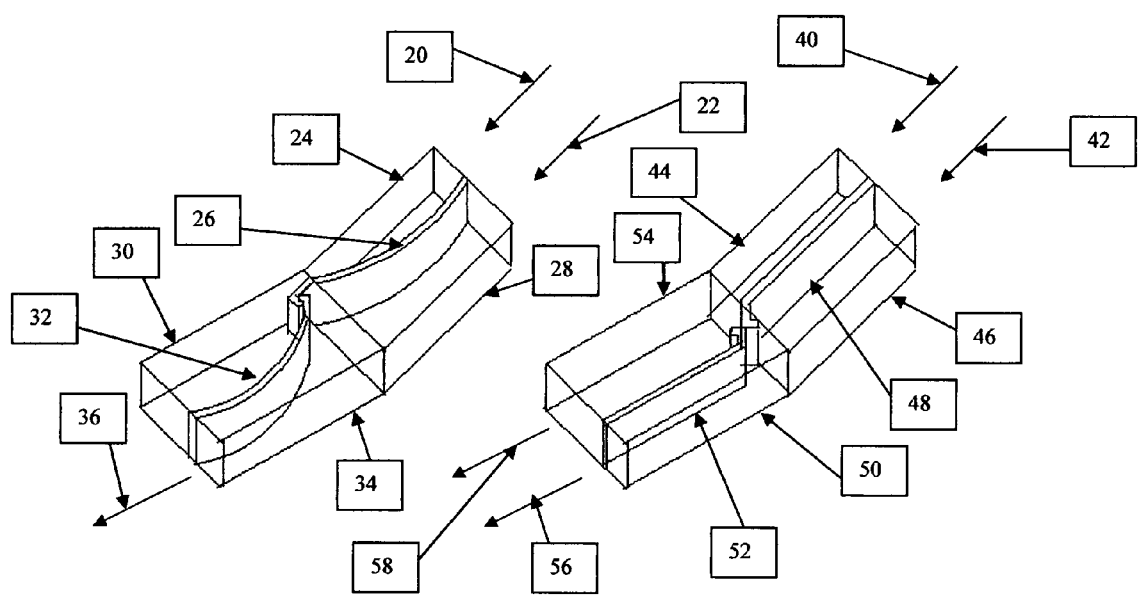
Figure 2 A                    Figure 2 B

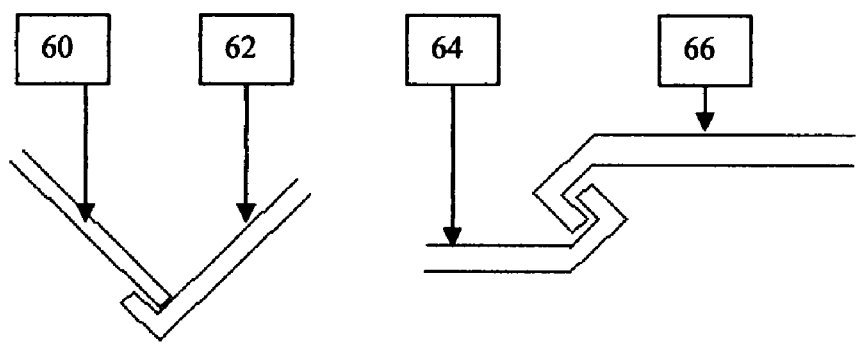
Figure 3 A                    Figure 3 B

US 7,499,607 B2

LIGHT TRIGGERED BENDING ELEMENT LIGHT SWITCH

This is a continuation of application Ser. No. 10/928,769 filed on Aug. 30, 2004 now U.S. Pat. No. 7,283,698

BACKGROUND OF THE INVENTION

1. Field of the Invention

This invention relates to a method for switching light signals in an optical wave-guide on or off at speeds faster than $10^{-11}$ seconds using light to trigger the switch in which a ELEMENT bends to close the channel. These switches can be arranged to stay latched until unlatched.

2. Description of the Prior Art

As technology advances communication of three-dimensional drawings, video, and software applications require more information to be communicated faster than ever. Fiber optical channels can handle much more information than wires can. The slowest part of a fiber optic communication channel at present are the fiber optic switching devices. At present fiber optic signals are switched using various methods that are actuated by transistors. One device pictured in trade journals is based on an array of mirrors. U.S. Pat. No. 6,178,033 issued to Joseph Ford et al, on Jan. 23, 2001, which teaches MICROMECHANICAL MEMBRANE TILT-MIRROR SWITCH, is an example of this kind of device. The mirrors are tilted to switch the optical signal from on to off or off to on. The tilting of the switch is actuated by circuits that use transistors, and so are bound to $10^{-9}$ seconds speeds at the best. U.S. Pat. No. 6,594,411 issued to Yueh Liang Chung et al, on Jul. 15 of 2003 which teaches OPTICAL SWITCH, makes mention of a piezoelectric element. The piezoelectric element is actuated by an electrical signal, which is again bound to the $10^{-9}$ seconds speeds that transistors can accomplish. U.S. Pat. No. 5,703,975 issued to William Miller et al, on Dec. 30, 1997 that teaches INTERFEROMETRIC SWITCH are physically long for the present need for miniaturized components. The components are more than a centimeter in length in William Miller's device.

SUMMARY OF THE INVENTION

LIGHT TRIGGERED BENDING ELEMENT LIGHT SWITCH uses the inability of electromagnetic waves to travel through a channel that is dimensionally smaller than the wave length to turn light off the light signal in a fiber optical channel. Opening up the fiber optical channel to a dimension large enough allows the LIGHT TRIGGERED BENDING ELEMENT LIGHT SWITCH to turn on the signal in an optical channel. The LIGHT TRIGGERED BENDING ELEMENT LIGHT SWITCH uses bending when exposed to a sufficient electric field of a ELEMENT constructed of two different orientations of piezoelectric material to effect the closing or opening of fiber optical channels. The electric field of light in the channel is the electric field that effects the change in the piezoelectric material. LIGHT TRIGGERED BENDING ELEMENT LIGHT SWITCH can switch faster than $10^{-11}$ seconds. This is 100 times faster than the MICROMECHANICAL MEMBRANE TILT-MIRROR SWITCH, OPTICAL SWITCH, or any transistor-actuated switch. LIGHT TRIGGERED BENDING ELEMENT LIGHT SWITCH can be made smaller than 30 microns in length, less than three microns in width, and high depending on the specific wavelength to be used in the fiber optic channel. Millions of these switches can be made in the area of one of the INTERFEROMETRIC SWITCH switches described above. LIGHT TRIGGERED BENDING ELEMENT LIGHT SWITCH will also be 100 or more times faster than the INTERFEROMETRIC SWITCH. Fiber optic communication will be made 100 or more times faster using the LIGHT TRIGGERED BENDING ELEMENT LIGHT SWITCHS and components will be able to be made the size of computer chip components. LIGHT TRIGGERED BENDING ELEMENT LIGHT SWITCH can use the light in one light channel to switch on or off the light in an adjacent light channel. The amount of information that can be transmitted across a fiber optic channel is far greater than can be transmitted across a normal telephone wire. Society needs fast communication of sound pictures and video signals. Currently the switching of these communication signals is limited by the speed of the transistor. Which switches at about $10^{-9}$ seconds. For society to achieve fast switching of signals the Bending ELEMENT Fiber Optic Switch is necessary. The LIGHT TRIGGERED LATCHING LIGHT SWITCHES can be built adjacent to each other so that the bending Elements will lock or latch together. This latching function will open the door to computers that use light to process information. The latching can be used to store information and make memory devices. Computers that the LIGHT TRIGGERED BENDING ELEMENT LIGHT SWITCH will make possible will be capable of functioning 100 times, or more, faster than current computers.

BRIEF DESCRIPTION OF THE DRAWINGS

FIG. 1A is a drawing of the switch on and FIG. 1B is a drawing of the switch in the off position.

FIG. 2 is the two LIGHT TRIGGERED BENDING ELEMENT LIGHT SWITCHES that are arranged to latch when actuated by the appropriate electric field. The electric field of light in light channels separated by piezoelectric Elements causes the piezoelectric Elements to bend into contact with each other. The ends of the piezoelectric Elements are fashioned to catch on each other becoming latched together. FIG. 2A is LIGHT TRIGGERED BENDING ELEMENT LIGHT SWITCH arranged to latch in the unlatched state, and FIG. 2B is LIGHT TRIGGERED BENDING ELEMENT LIGHT SWITCH arranged to latch in the latched state.

FIG. 3 is a detail of latching switch latches. FIG. 3A is a latch for a right angle or near right LIGHT TRIGGERED BENDING ELEMENT LIGHT SWITCH arranged to latch. FIG. 3B is a latch for a straight angle or near straight LIGHT TRIGGERED BENDING ELEMENT LIGHT SWITCH arranged to latch LIGHT TRIGGERED BENDING ELEMENT LIGHT SWITCH may be in channels of different dimensions so that different wavelengths of light can be used to actuate them. The widths of the channels may be slightly different or the height of the channels may be slightly different.

BEST MODE FOR CARRYING OUT THE INVENTION

Figure 1:
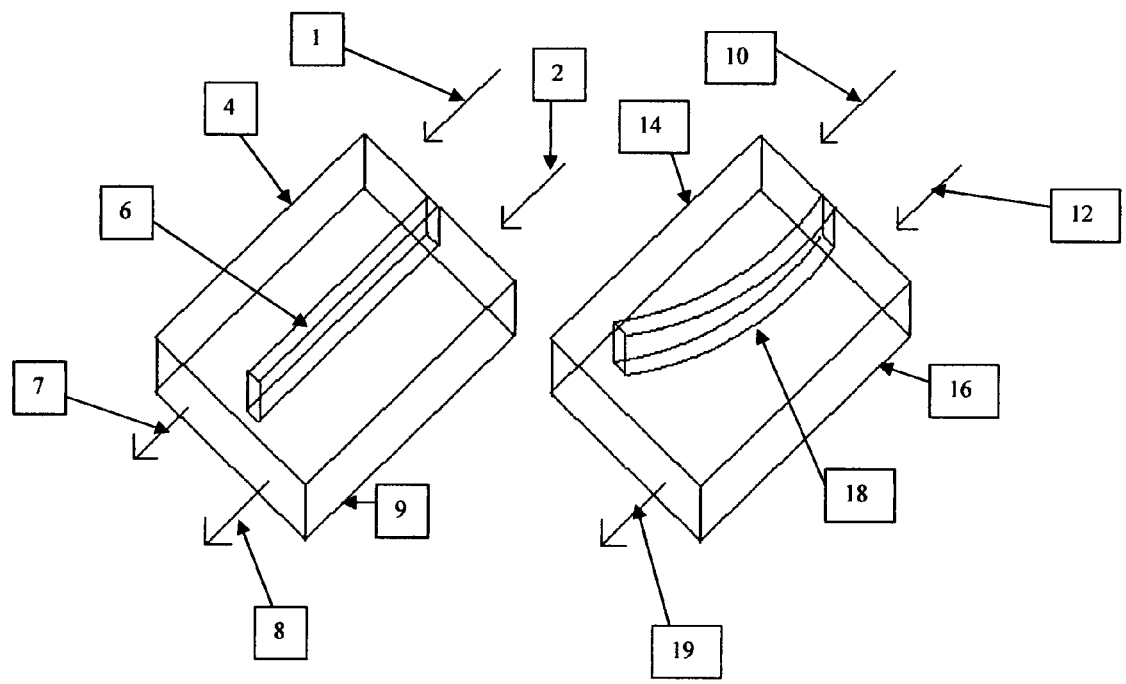
FIG. 1 is the LIGHT TRIGGERED BENDING ELEMENT LIGHT SWITCH. The electric field of the light in a channel parallel to the piezoelectric ELEMENT causes the response of the piezoelectric material that shrinks the adjacent channel to dimensions too small to allow the light signal to pass through the channel.

The LIGHT TRIGGERED BENDING ELEMENT LIGHT SWITCH uses the characteristic of piezoelectric material that the dimensions of the piezoelectric ELEMENT change when it is influenced by an electric field. The electric field of light in a channel is the electric field that the piezoelectric material responds to in this invention. Light channels are arranged to be larger or smaller as the piezoelectric materials change dimensions in responds to the influence of the electric field. When a light channel is opened up from being to small to allow light signals to pass though them by the response of the piezoelectric material to the electric field of light passing through the channel, the switch is on. When the channel is made small enough, light signals of cretin wavelengths will no longer pass through the smaller channel. When the light signals will not pass through the light channel that has been made smaller, the signal is switched off. Some piezoelectric materials have a crystal orientation that must be aligned with the electric field that will cause it to change shape. Other piezoelectric materials can be heated up in a magnetic field and oriented to respond in the desired direction to the electric field that will be applied. In constructing LIGHT TRIGGERED BENDING ELEMENT LIGHT SWITCHES, the piezoelectric Elements will be constructed of two sides. One side of the bending ELEMENT will have a crystal orientation along the length of the piezoelectric ELEMENT. The other side of the piezoelectric ELEMENT will have the crystal oriented perpendicular to the length of the bending ELEMENT. The electric field will cause the ELEMENT to bend as these two different orientations of piezoelectric material are affected by the electric field of the light in the channel. Examples of piezoelectric materials that can be oriented in a magnetic field are lead zirconate and lead titanate or lead zicronate titanate, also called PZT. For and example, the electric field in volts to be derived from the power in watts of the light in the channel from a form of the Poynting vector equation which is written $E=(2\mu_o \ c \ P)^{1/2}$. Where $\mu_o$ is 4 pi $\times 10^{-7}$ Weber/amp-meter and c is $3\times 10^8$ meters/second. Using this relation it is found that the voltage developed by a 150-milliwatt signal in a fourth of a micron channel is 10 volts. This voltage will be employed to actuate the Latching Fiber Optic Switch. The voltage the light develops will change the dimensions of the 2065 Å channel by 40 Å when lead zecronate titnate is used. Lead zecronate titonate has a piezoelectric strain coefficient of $3.90\times 10^{-10}$ meters/volt. 818 nm light (8180 Å) commonly used for fiber optics will be able to travel in a channel just bigger than 2045 Å and will not travel down a channel smaller. When the 2065 Å channel changes to 2014 Å light will be shut off of a wave length of 8180 Å or more, while light of a wave length of 8056 Å or less will still pass through. In the present invention, the switching mechanism is a bending piezoelectric ELEMENT that bends in the presence of an electric field of appropriate orientation and power. Such a ELEMENT is composed of two sides with a flexible metallic film between the two sides. The method for fabricating the bending ELEMENT is as follows: First a non-oriented piezoelectric layer is deposited on a substrate that can be a silicon wafer with a metal coating. Then channels are etched in the piezoelectric layer. The flexible metal film is deposited into the channels that were etched. The excess metal film is removed, and the piezoelectric layer is oriented along the length of the Elements that will be the bending Elements. The side that will be bent toward is then oriented perpendicular to the length of the bending ELEMENT by imposing a high electric field to the flexible metal film. The high electric field is maintained on the side that will be oriented perpendicular to the length of the bending ELEMENT by a second flexible metal film that is near to the side of the bending ELEMENT that is to be oriented perpendicular to the length of the ELEMENT. The proximity of the second metal film on the one side assures that only one side is reoriented to the perpendicular orientation, and the other side can maintain the orientation along the length of the ELEMENT. An ELEMENT constructed in this fashion when an electric field of an appropriate light signal interacts with it will bend. As has been discussed if the ELEMENT bends a sufficient distance the light channel will be closed to the passage of light signals. Further, if two such Elements with ends that can latch are bent into a latched condition the light signal that can be tuned off and the latching switch will maintain the off condition once there is no light in the channel. A latched switch can be unlatched by the application of light in the proper sequence to bend the Elements affecting an unlatching. The drawings illustrate the way the LIGHT TRIGGERED BENDING ELEMENT LIGHT SWITCH and latching light switches function. In FIG. 1A, the arrow numbered 1 is the arrow that indicates the light moving trough the light channel into a LIGHT TRIGGERED BENDING ELEMENT LIGHT SWITCH on one side. The side that arrow 1 is going into is the on and off side of the light switch. Arrow 2 indicates the light moving through the LIGHT TRIGGERED BENDING ELEMENT LIGHT SWITCH on the triggering side. Rectangular channel 4 is the on and off side of the LIGHT TRIGGERED BENDING ELEMENT LIGHT SWITCH, the side that the bending ELEMENT bends toward. Rectangular solid 6 is the straight bending ELEMENT. The ELEMENT is not being acted upon by the electric field of a switching signal that would be of sufficient power to cause the ELEMENT to bend. Rectangular channel 9 is the side of the LIGHT TRIGGERED BENDING ELEMENT LIGHT SWITCH that is away from the direction of the bend that the bending ELEMENT can be caused to bend. Arrow 7 is the light coming out of the LIGHT TRIGGERED BENDING ELEMENT LIGHT SWITCH when the bending ELEMENT is not bent. The switch is on in this position. Arrow 8 is the light coming out of the side away from the direction of the bend of the bending ELEMENT which can turn on or off the signal passing through the switch by the electric field of the light passing through switch.

In FIG. 1B, arrow 10 is the light coming into the LIGHT TRIGGERED BENDING ELEMENT LIGHT SWITCH that will be shut off by the closing of the channel by the bending ELEMENT when it is bent. Arrow 12 is indicating the light entering the side away form the side that the bending ELEMENT can bend into and shut off the light signal. The light indicated by arrow 12 is o f sufficient power to actuate the switch. Light channel 14 is the light channel that the bending ELEMENT bends into to shut off the signal. Light channel 16 is the side of LIGHT TRIGGERED BENDING ELEMENT LIGHT SWITCH away form the direction of the bending ELEMENT. Bent ELEMENT 18 is the bent bending ELEMENT in the bent condition. No light is passing through the side of the switch that the bending ELEMENT has moved into. The switch is in the off position. Arrow 19 is the light still passing through the side of the LIGHT TRIGGERED BENDING ELEMENT LIGHT SWITCH that is away from the direction that the bending ELEMENT bends to turn off the light signal.

In FIG. 2A, Arrow 20 indicates the light passing into the side of the LIGHT TRIGGERED BENDING ELEMENT LIGHT SWITCH that is constructed to allow the signal to be turned on or off if the latching Elements are bent and latched. Arrow 22 indicates the light passing into the side away form the side of the LIGHT TRIGGERED BENDING ELEMENT LIGHT SWITCH that the bending Elements bend toward when they bend. Rectangular channel 24 is the first side of the LIGHT TRIGGERED BENDING ELEMENT LIGHT SWITCH on the side that the bending Elements bend toward when they bend. Bend ELEMENT 26 is the first half of the LIGHT TRIGGERED BENDING ELEMENT LIGHT SWITCH that is bent and latched to shut off the light signal. Rectangular channel 28 is the side of the light channel that is away from the side that the bending ELEMENT can bend toward and shut off the signal. Rectangular channel 30 is the second half of the light channel on the side that the bending and latching Elements can bend toward to latch and shut off the light from passing through the channel. Bending ELEMENT 32 is the second half of the LIGHT TRIGGERED BENDING ELEMENT LIGHT SWITCH that is bent and latched so no light can pass through. The switch is off. Rectangular channel 34 is the second half of LIGHT TRIGGERED BENDING ELEMENT LIGHT SWITCH that is away from the side of the switch that the bending Elements bend toward. Arrow 36 is the light passing out of the side of the LIGHT TRIGGERED BENDING ELEMENT LIGHT SWITCH that is away form the side that the direction that the bending and latching Elements bend toward. It will be noted that there is no arrow indicating light is coming out of the switch on the side that the Elements bend toward.

In FIG. 2B, Arrow 40 is the light entering the LIGHT TRIGGERED BENDING ELEMENT LIGHT SWITCH that is constructed to latch on the side that the light signal can be turned on or off when the Elements bend and latch. This is the side toward which the bending Elements bend when they bend. Rectangular light channel 44 is the first half of LIGHT TRIGGERED BENDING ELEMENT LIGHT SWITCH that the bending ELEMENT bends into this side of the switch when it bends. Arrow 42 is the light entering the LIGHT TRIGGERED BENDING ELEMENT LIGHT SWITCH that has been constructed to latch on the side away form the direction that the bending ELEMENT bends. Bending ELEMENT 48 is the first ELEMENT in the LIGHT TRIGGERED BENDING ELEMENT LIGHT SWITCH that can latch. It is in the unbent state. The switch is in the on state. There is not sufficient power in the switching light to cause the ELEMENT to bend and latch. Rectangular channel 50 is the second half of the LIGHT TRIGGERED BENDING ELEMENT LIGHT SWITCH that can latch away from the direction that the bending ELEMENT will bend. The light in this side of the LIGHT TRIGGERED BENDING ELEMENT LIGHT SWITCH that can latch will not be turned on or off by the bending of the Elements. Rectangular light channel 54 is the second half of the channel in LIGHT TRIGGERED BENDING ELEMENT LIGHT SWITCH that can latch that the bending Elements bend into and causes the light signal to be tuned on or off by the bending of the latching Elements. Bending ELEMENT 52 is the second bending ELEMENT that latches with bending ELEMENT 48 when the switch is latched off. It is not bent. There is not enough power in the switching light to cause the ELEMENT to bend and latch. The switch is in the on state. Arrows 56 and 58 are the light passing out of the LIGHT TRIGGERED BENDING ELEMENT LIGHT SWITCH which is made to latch in the on state.

FIG. 3A is a drawing of two latching Elements as they could be made to latch. Bending ELEMENT 60 is one bending ELEMENT that would be latched into position when caught by the other ELEMENT of the pair numbered 62. FIG. 3B is a drawing of two latching Elements as they could be made to latch. Bending ELEMENT 64 is one bending ELEMENT that would latched into position when caught by the other bending ELEMENT of the pair number 66. Other latching shapes could be used to perform the desired function of latching once bent into position. Some latching geometry's will work better for LIGHT TRIGGERED BENDING ELEMENT LIGHT SWITCH that are arranged at right angles while others will be better used in a near straight angle configuration. The three drawings of the LIGHT TRIGGERED BENDING ELEMENT LIGHT SWITCH are schematic drawings. In actual switches, additional layers of material will be used to secure, cover, and align the fiber optic switches in a fiber optic assembly.

What I claim as my invention is:

1. An optical switch for light in an optical wave guide, the optical switch comprising:
    a first and a second light channel, said first and second light channels being parallel light channels; and
    a bending element between said first and second parallel light channels, the bending element comprising piezoelectric materials having two different crystal orientations which cause the bending element to bend in response to an electric field of a switching light that is applied to said first light channel,
    said bending element and said first light channel being configured so that said switching light does not impinge on said bending element,
    said bending element being configured relative to said first and second parallel light channels such that a light signal is:
    a) able to pass through said second light channel when the switching light is not applied to said first light channel; and
    b) not able to pass through said second light channel when the switching light is applied to said first light channel.

2. The switch of claim 1 wherein the bending element comprises two sides of piezoelectric material, wherein the piezoelectric material on one side of the bending element is oriented along the length of the bending element and wherein the piezoelectric material on the other side of the bending element is oriented perpendicular to the length of the bending element.

3. The switch of claim 1 wherein the bending element comprises two sides of piezoelectric material connected to a central flexible material part, wherein the piezoelectric material on one side of the bending element is oriented along the length of the bending element and wherein the piezoelectric material on the other side of the bending element is oriented perpendicular to the length of the bending element.

4. The switch of claim 1 further comprising means for maintaining, in the absence of the switching light, the shape of the bending element in a state that prevents the light signal from passing through one of the two parallel light channels.

5. The switch of claim 1 wherein the two different crystal orientations are perpendicular to each other.

6. An optical switch for light in an optical wave guide, the optical switch comprising:
    a first and a second light channel, said first and second light channels being parallel light channels; and
    a bending element between said first and second parallel light channels, the bending element comprising piezoelectric materials having two different crystal orientations which cause the bending element to bend in response to an electric field of a switching light that is applied to said first light channel;
    said bending element and said first light channel being configured so that said switching light does not impinge on said bending element,
    the bending element being configured relative to said first and second parallel light channels such that the switch is
    a) on when the bending element is not bent; and b) off when the bending element is bent.

7. The switch of claim 6 wherein the two different crystal orientations are perpendicular to each other.

8. A method for operating an optical switch, the method comprising:

applying a light signal to a signal channel that comprises a bending element, wherein the bending element comprises piezoelectric materials having two different crystal orientations which cause the bending element to bend in response to an electric field of a switching light that is applied to a switching channel parallel to said signal channel;

applying a switching light to said switching channel, wherein an electric field of the switching light is present without said switching light impinging on said bending element, said electric field having sufficient power to change the shape of the bending element such that the light signal is prevented from passing through the signal channel.

9. The method of claim 8 wherein the two different crystal orientations are perpendicular to each other.

10. The method of claim 8 further comprising maintaining, in the absence of the switching light, the shape of the bending element in a state that prevents the light signal from passing through the signal channel.

11. The method of claim 10 wherein maintaining the shape of the bending element comprises latching the bending element in a bent state.

12. The method of claim 8 wherein applying a switching light to the bending element comprises passing the switching light through a switching light channel.

13. The method of claim 8 wherein the switching light channel is formed in part by the bending element.

* * * * *